(12) United States Patent
Kozel et al.

(10) Patent No.: US 11,146,045 B2
(45) Date of Patent: Oct. 12, 2021

(54) INTERNAL ROBOT-MANIPULATOR FOR UNMANNED OPERATION AND MAINTENANCE IN WITHDRAWABLE CIRCUIT BREAKERS, AND A METHOD OF OPERATING THE ROBOT-MANIPULATOR

(71) Applicant: ABB Schweiz AG, Baden (CH)

(72) Inventors: Tomas Kozel, Brno (CZ); Thomas Schmidtchen, Houston, TX (US); Martin Stefanka, Rajhrad (CZ)

(73) Assignee: ABB SCHWEIZ AG, Baden (CH)

( * ) Notice: Subject to any disclaimer, the term of this patent is extended or adjusted under 35 U.S.C. 154(b) by 25 days.

(21) Appl. No.: 16/727,988

(22) Filed: Dec. 27, 2019

(65) Prior Publication Data

US 2020/0136358 A1    Apr. 30, 2020

Related U.S. Application Data

(63) Continuation of application No. PCT/EP2018/066997, filed on Jun. 25, 2018.

(30) Foreign Application Priority Data

Jun. 28, 2017  (EP) ..................... 17178408
Dec. 21, 2017  (EP) ..................... 17209684

(51) Int. Cl.
*H02B 11/133*    (2006.01)
*B25J 11/00*    (2006.01)
*H02B 3/00*    (2006.01)
*B25J 9/00*    (2006.01)
*B25J 13/00*    (2006.01)

(52) U.S. Cl.
CPC ............. *H02B 11/133* (2013.01); *B25J 9/00* (2013.01); *B25J 11/005* (2013.01); *B25J 13/00* (2013.01); *H02B 3/00* (2013.01)

(58) Field of Classification Search
None
See application file for complete search history.

(56) References Cited

U.S. PATENT DOCUMENTS 9,079,317 B2 *  7/2015  Preisinger ................ B25J 19/06
9,281,653 B2 *  3/2016  Stadler ................ H01S 3/10038
(Continued)

FOREIGN PATENT DOCUMENTS

CN    202111382 U    1/2012
CN    102916352 A    2/2013
(Continued)

*Primary Examiner* — Courtney L Smith
(74) *Attorney, Agent, or Firm* — Leydig, Voit & Mayer, Ltd.

(57) ABSTRACT

An indoor switchgear or controlgear arrangement with unmanned operation and maintenance, for use in low, medium, or high voltage, includes: an arrangement of switching devices in an inner housing, which is furthermore provided with an outer housing; and a robot system, acting mainly in the inner housing. At least the switching devices other than maintenance critical parts are withdrawable. The switchgear or controlgear is provided with interlocks in order to prevent a wrong sequence of operation and prevent access to potentially hazardous compartments. Metallic segregation is provided internally in the inner housing in order to achieve a needed service continuty level.

4 Claims, 2 Drawing Sheets

(56) References Cited

U.S. PATENT DOCUMENTS

| | | | |
|---|---|---|---|
| 9,383,739 B2* | 7/2016 | Schauer | G06F 1/263 |
| 9,770,823 B2* | 9/2017 | Huang | B25J 11/002 |
| 10,065,317 B2* | 9/2018 | Tan | B61G 7/04 |
| 10,239,214 B2* | 3/2019 | Zimmermann | B25J 13/00 |
| 2008/0235970 A1* | 10/2008 | Crampton | B25J 13/088 33/503 |
| 2013/0231779 A1* | 9/2013 | Purkayastha | B25J 9/1697 700/259 |
| 2016/0261096 A1* | 9/2016 | Nikodem | H02B 11/127 |
| 2017/0085064 A1 | 3/2017 | Brandon et al. | |
| 2019/0019706 A1* | 1/2019 | Takusari | H01L 21/67276 |
| 2020/0093026 A1* | 3/2020 | Enright | B25J 9/026 |

FOREIGN PATENT DOCUMENTS

| | | |
|---|---|---|
| CN | 202856158 U | 4/2013 |
| CN | 204835351 U | 12/2015 |
| CN | 105470830 A | 4/2016 |
| CN | 205335738 U | 6/2016 |
| CN | 105826854 A | 8/2016 |
| CN | 105881505 A | 8/2016 |
| CN | 106384941 A | 2/2017 |
| CN | 206003655 U | 3/2017 |
| CN | 206135283 U | 4/2017 |
| CN | 206163975 U | 5/2017 |
| CN | 206225814 U | 6/2017 |
| CN | 206250658 U | 6/2017 |
| JP | 09130929 A | 5/1997 |
| WO | WO 2015081455 A1 | 6/2015 |

\* cited by examiner

INTERNAL ROBOT-MANIPULATOR FOR UNMANNED OPERATION AND MAINTENANCE IN WITHDRAWABLE CIRCUIT BREAKERS, AND A METHOD OF OPERATING THE ROBOT-MANIPULATOR

CROSS-REFERENCE TO PRIOR APPLICATION

This application is a continuation of International Patent Application No. PCT/EP2018/066997, filed on Jun. 25, 2018, which claims priority to European Patent Application No. EP 17178408.5, filed on Jun. 28, 2017 and European Patent Applicant No. EP 17209684.4, filed on Dec. 21, 2017. The entire disclosure of the foregoing applications is hereby incorporated by reference herein.

FIELD

The invention relates to an indoor switchgear or controlgear with unmanned operation and maintenance, and method of operating the same.

BACKGROUND

One of the development focus in the field of indoor switchgear or controlgear in medium or high voltage, in last decades is driven by operators and maintenance personnel safety. In current design depending on service continuity requirements the indoor switchgear or controlgear is segregated into compartments to protect the personnel working on one part of the system (compartment) from touching live parts in other part of the system (compartment).

The switchgear or controlgear outer enclosure is made robust to protect the personnel from internal arc flash and internal arc blast in case of internal switchgear or controlgear failure.

SUMMARY

In an embodiment, the present invention provides an indoor switchgear or controlgear arrangement with unmanned operation and maintenance, for use in low, medium, or high voltage, comprising: an arrangement of switching devices in an inner housing, which is furthermore provided with an outer housing; and a robot system, acting mainly in the inner housing, wherein at least the switching devices other than maintenance critical parts are withdrawable, wherein the switchgear or controlgear is provided with interlocks in order to prevent a wrong sequence of operation and prevent access to potentially hazardous compartments, and wherein metallic segregation is provided internally in the inner housing in order to achieve a needed service continuty level.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention excludes most of the human safety related components from the switchgear or controlgear design while keeping the switchgear or controlgear service continuity and personnel safety aspects on the highest levels.

In an embodiment, the present invention describes the idea how to exclude most of the human safety related components from the switchgear or controlgear design, while keeping the switchgear or controlgear service continuity and personnel safety aspects on the highest levels.

So, the switchgear or controlgear is provided with a robot system, acting mainly in the inner housing, and at least the switching devices other maintenance critical parts are withdrawable, that the switchgear or controlgear is provided with interlocks, in order to prevent wrong sequence of operation and prevent access to potentially hazardous compartments, and that metallic, internally in the inner housing segregation is provided, in order to achieve needed service continuty level.

Referring to a method for operating the same, the switchgear or controlgear is provided with a robot system, acting mainly in the inner housing, in such, that at least the switching devices other maintenance critical parts are withdrawable, and that the switchgear or controlgear is provided with interlocks, in order to generate "allowed" sequences of actions successively, in order to prevent wrong sequence of operation and prevent access to potentially hazardous compartments, and that metallic, internally in the inner housing segregation is provided, in order to achieve needed service continuty level.

Both, the method for operating, as well as the switchgear or controlgear can be used in low-voltage, as well as in medium voltage, as well as in high voltage.

Most significant and evident are the advantages in medium and high voltage.

In a further advantageous embodiment, the segregation of the inner operating room ore area follows required partition classes.

In a final advantageous embodiment, an appropriate outer enclosure for the external housing ensures required internal arc classification.

Figure 1:
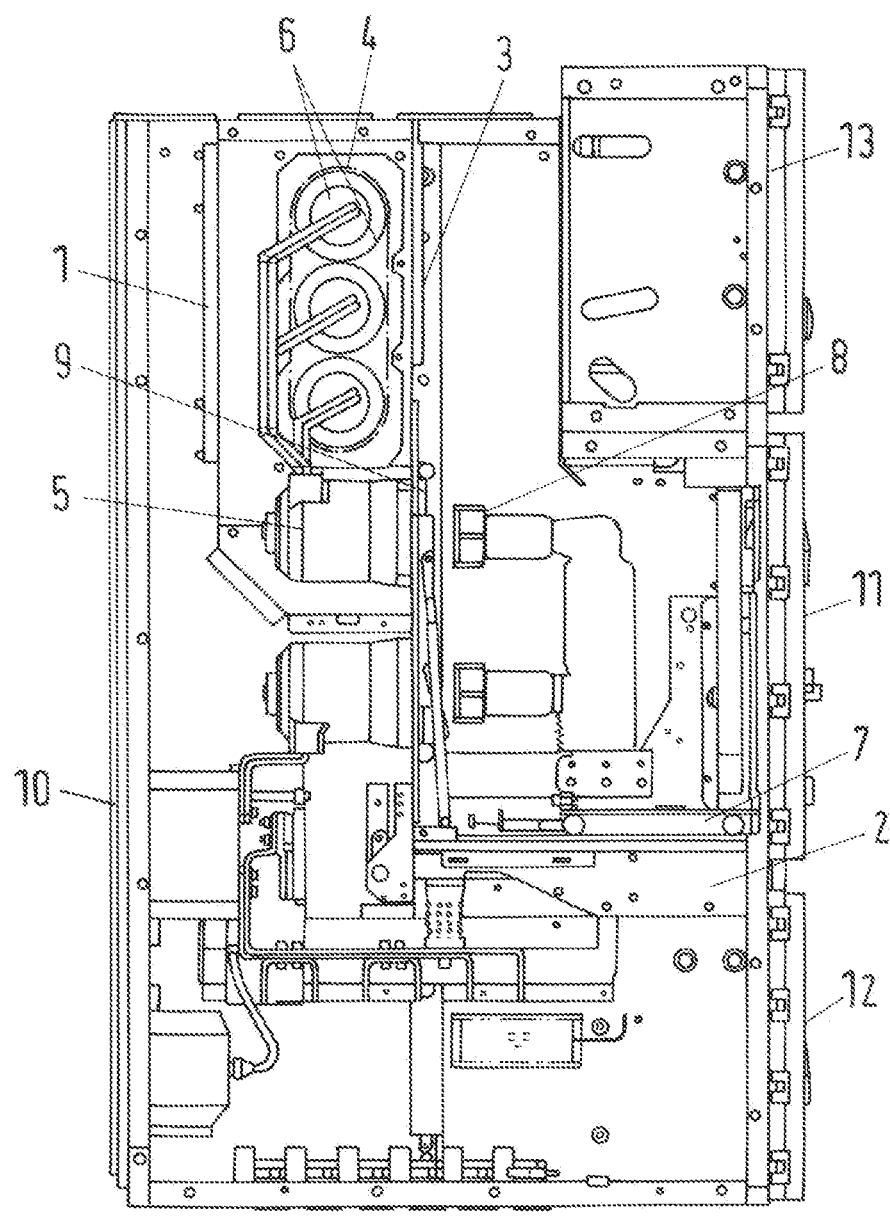
FIG. 1: state of the art
Figure 2:
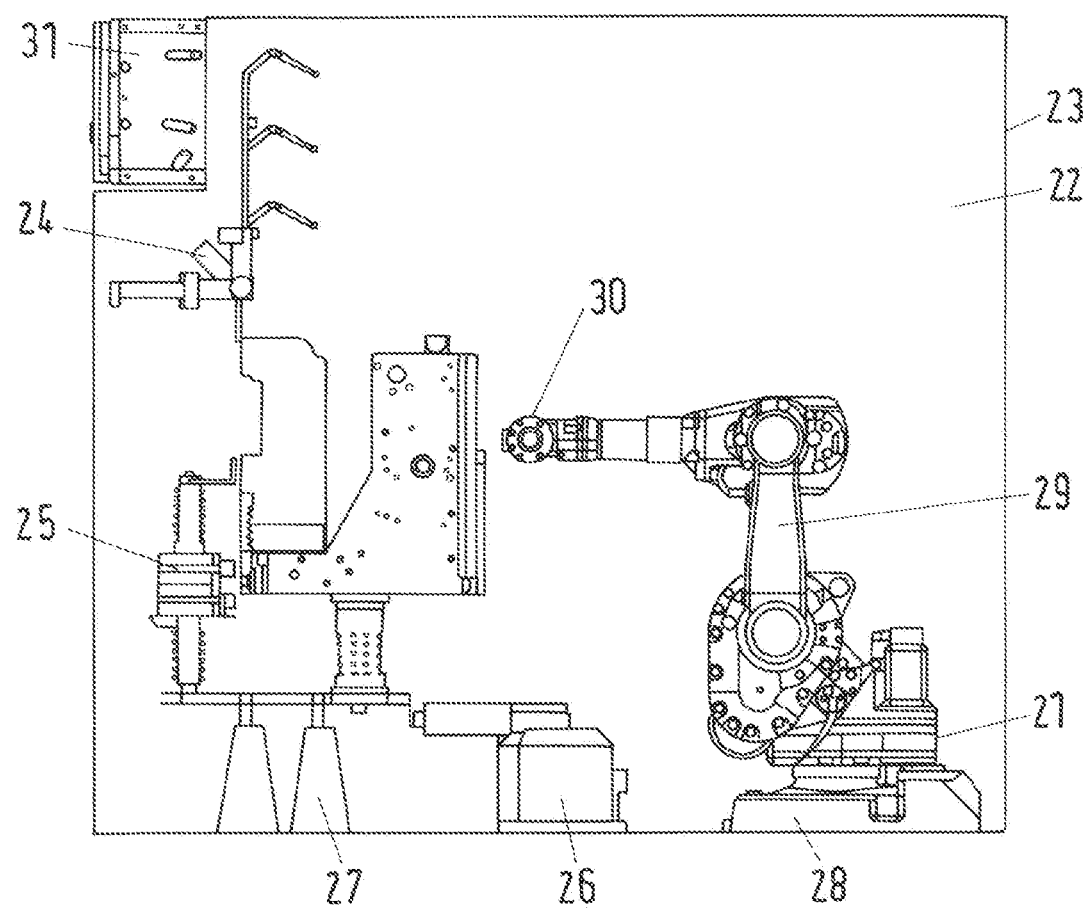
FIG. 2: embodiment of the invention

Example of such a switchgear or controlgear or even switchgear room consisting of several switchgear or controlgear line-ups is shown on FIG. 2.

Current switchgear or controlgear design includes following provisions to achieve required safety of operational stuff:
switching devices and other maintenance critical parts withdrawable,
interlocks to prevent wrong sequence of operation and prevent access to potentially hazardous compartments,
metallic internal segregation to achieve needed service continuty level,
required partition class
appropriate outer enclosure to ensure required internal arc classification.

The first assumption to exclude the operator safety related components from the switchgear or controlgear design is to create such a design that human personnel is not involved in switchgear or controlgear operation and maintenance processes. This means that all manual (emergency) operation and maintenance tasks are provided in other way—preferably by dedicated robotic system 21 embedded inside the switchgear or controlgear. Removing the personnel safety related components from the switchgear or controlgear design helps to keep the requirements for the dexterity of the dedicated robotic system low, which means currently available robotic systems such as industrial robotic arms on rail vehicle or unmanned ground vehicles with manipulators should be able to provide manual operation and maintenance in a similar scope to what is today ensured by human personnel.

Considering no human operator ever enters the switchgear or controlgear internal space containing primary circuits 22 when the circuits are energized, the outer arc proof enclosure 23 is the only element needed for guaranteeing personnel safety.

The internal switchgear or controlgear space 22 doesn't require segregation into compartments and metallic segregation plates 1, 2, and 3 as well as all the bushings 4 and 5 and sealings 6 can be eliminated from the system.

The switching apparatus can be fixed instead of withdrawable, as the embedded robotic system can ensure the maintenance of the switching apparatus even when the switching device is fixed to the primary circuit. Thus circuit breaker isolating rossette-spout contacts 8 and withdrawable mechanisms 7 including the interlocks can be eliminated from the system.

The shutter system 9 can be eliminated as well. A three position disconnector switch 24 shall be included in each switchgear or controlgear unit circuit to provide isolation from main busbars and earthing of a the switchgear or controlgear units circuits.

The cable connection part of the primary circuits should include current and voltage instrument transformers or sensors 25 and 26 and conical cable connection points 27 known from current generation of gas insulated switchgears to properly seal the cable entry.

As alternative design to the feeder circuits design described in above two sections, the circuit breaker can be made withdrawable with isolating contacts. The withdrawable mechanism is adjusted to be easily operated by robot and its complexity is reduced to minimum. The circuit breaker isolating contact serve as points of disconnection and a dedicated earthing switch is available on the cable side. This alternative design is useful in case we consider replacement of the whole circuit breaker as one of the required switchgear or controlgear operation actions.

The robotic system 21 shall include a movable base 28 that will move the robotic system along the lineup of switchgear or controlgear units, a robotic manipulator for performing different operation and maintenance tasks 29 ended with robotic wrist 30. The robotic system tooling shall include various devices for inspection, measurements, manipulation, monitoring, maintenance etc.

The robot safety systems should include sensors for detection of the primary circuits energization state to prevent the manipulator approaching energized circuits. The robotic manipulator safe operating zone depends on switchgear or controlgear energization status. If system is energized robotic arm manipulating zone is limited to area given by safe clearance and creepage distance from live circuits.

The switchgear or controlgear internal space 22 can be filled with air or alternatively with gas with insulating properties in proper pressure and concentrations. The internal space is effectively segregated from the outer environment by the arc proof enclosure 23 which helps to keep the switchgear or controlgear internal space free of ambient environment influence. If heat exchange with ambient environment is needed, a passive or active heat exchange device can be added preventing direct air exchange with outer environment.

For handling the pressurized hot gasses developing during internal arc faults of the switchgear or controlgear, a system of pressure relief flaps known from air insulated switchgears or a pressure relief membrane known from the gas insulated switchgears can be applied. Active arc fault duration limiting devices can be included to limit the level of damage to the equipment in case of internal arc fault event.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An indoor switchgear or controlgear arrangement with unmanned operation and maintenance, for use in low, medium, or high voltage, comprising:
    an arrangement of switching devices in an inner housing, which is furthermore provided with an outer housing; and
    a robot system, acting mainly in the inner housing,
    wherein at least the switching devices other than maintenance critical parts are withdrawable by the robot system from the indoor switchgear or the controlgear arrangement,
    wherein the switchgear or the controlgear is provided with interlocks in order to prevent a wrong sequence of operation and prevent access to potentially hazardous compartments, the interlocks preventing entry into the inner housing when the switching devices are energized, and
    wherein metallic segregation is provided internally in the inner housing in order to achieve a needed service continuty level.

2. A method for operating an indoor switchgear or controlgear arrangement with unmanned operation and maintenance, for use in low, medium, or high voltage, comprises:
    providing an arrangement of switching devices in an inner housing, which is furthermore provided with an outer housing; and
    providing a robot system, acting mainly in the inner housing, such that at least the switching devices other than maintenance critical parts are withdrawable by the robot system from the indoor switchgear or the controlgear arrangement,
    wherein the switchgear or the controlgear is provided with interlocks in order to generate "allowed" sequences of actions successivley, prevent a wrong sequence of operation, and prevent access to potentially hazardeous compartments, the interlocks preventing entry into the inner housing when the switching devices are energized, and wherein metallic segregation is internally provided in the inner housing in order to achieve a needed service continuty level.

3. The method according to claim 2, wherein the segregation of the inner housing follows required partition classes.

4. The method according to claim 2, wherein an appropriate outer enclosure for the outer housing ensures required internal arc classification.

* * * * *